United States Patent
Ishikawa et al.

(10) Patent No.: US 11,277,787 B2
(45) Date of Patent: Mar. 15, 2022

(54) COMMUNICATION CONTROL APPARATUS AND COMMUNICATION CONTROL METHOD

(71) Applicant: NTT DOCOMO, INC., Tokyo (JP)

(72) Inventors: Hiroshi Ishikawa, Tokyo (JP); Na Yo, Tokyo (JP); Keiichi Kanbara, Tokyo (JP); Kazuto Shimizu, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 17 days.

(21) Appl. No.: 16/754,034

(22) PCT Filed: Oct. 11, 2018

(86) PCT No.: PCT/JP2018/037898
§ 371 (c)(1),
(2) Date: Apr. 6, 2020

(87) PCT Pub. No.: WO2019/074045
PCT Pub. Date: Apr. 18, 2019

(65) Prior Publication Data
US 2020/0329420 A1    Oct. 15, 2020

(30) Foreign Application Priority Data

Oct. 12, 2017   (JP) ............................. JP2017-198852

(51) Int. Cl.
*H04W 48/14* (2009.01)
*H04W 88/16* (2009.01)

(52) U.S. Cl.
CPC ........... *H04W 48/14* (2013.01); *H04W 88/16* (2013.01)

(58) Field of Classification Search
None
See application file for complete search history.

(56) References Cited

U.S. PATENT DOCUMENTS

2009/0047947 A1    2/2009  Giaretta et al.
2014/0003233 A1*   1/2014  Rune .................. H04W 28/085
                                                           370/230

(Continued)

FOREIGN PATENT DOCUMENTS

CN          111183681 A      5/2020
JP          2010-535456 A    11/2010

OTHER PUBLICATIONS

Office Action issued in Japanese Application No. 2019-548231; dated Mar. 30, 2021 (7 pages).

(Continued)

*Primary Examiner* — Hong S Cho
(74) *Attorney, Agent, or Firm* — Osha Bergman Watanabe & Burton LLP

(57) ABSTRACT

A communication control apparatus including: a control unit that determine whether to select a gateway having a specific function for a user equipment based on capability information received from the user equipment and a service availability information of the user equipment received from a subscriber information management apparatus; a transmission unit that transmits an inquiry signal including a parameter indicating that the specific function can be used to a DNS when the control unit determines to select the gateway having the specific function for the user equipment; and a reception unit that receives a list of gateways having the specific function from the DNS.

5 Claims, 6 Drawing Sheets

(56) References Cited

U.S. PATENT DOCUMENTS

2018/0035324 A1* 2/2018 Chen ................ H04W 28/0205
2020/0329420 A1 10/2020 Ishikawa et al.

OTHER PUBLICATIONS

International Search Report issued in PCT/JP2018/037898 dated Dec. 18, 2018 (5 pages).
Written Opinion of the International Searching Authority issued in PCT/JP2018/037898 dated Dec. 18, 2018 (5 pages).
3GPP TS 24.301 V15.0.1; "3rd Generation Partnership Project; Technical Specification Group Core Network and Terminals; Non-Access-Stratum (NAS) protocol for Evolved Packet System (EPS); Stage 3 (Release 15)"; Sep. 2017 (496 pages).
3GPP TS 23.401 V15.1.0; "3rd Generation Partnership Project; Technical Specification Group Services and System Aspects; General Packet Radio Service (GPRS) enhancements for Evolved Universal Terrestrial Radio Access Network (E-UTRAN) access (Release 15)"; Sep. 2017 (397 pages).
3GPP TS 24.008 V15.0.0; "3rd Generation Partnership Project; Technical Specification Group Core Network and Terminals; Mobile radio interface Layer 3 specification; Core network protocols; Stage 3 (Release 15)"; Sep. 2017 (782 pages).
Office Action issued in counterpart Chinese Patent Application No. 201880065157.9 dated Jul. 12, 2021 (12 pages).
Extended European Search Report issued in European Counterpart Application No. 18867212.5 dated Jul. 21, 2021 (9 pages).

* cited by examiner

COMMUNICATION CONTROL APPARATUS AND COMMUNICATION CONTROL METHOD

TECHNICAL FIELD

The present invention relates to a technique for selecting a gateway in a communication system.

BACKGROUND ART

Currently, radio services by LTE (to be referred to as 4G) are widely provided. In 3GPP, in order to realize a further increase in system capacity from 4G, further increase in data transmission speed, further lower delay in a radio section, etc., studies on a radio communication method called 5G are progressing. In 5G, various technologies are being studied to satisfy the requirement that the delay of the radio section be 1 ms or less while achieving a throughput of 10 Gbps or more.

For example, in 5G, in order to realize ultra high speed, large capacity, and ultra low delay, use of a high frequency band which is easy to secure a wideband in addition to the existing low frequency band is being studied. A radio network supporting 5G is called NR (New Radio).

PRIOR ART DOCUMENT

Non-Patent Document

[Non-Patent Document 1] 3GPP TS 24.301 V15.0.1 (2017 September)
[Non-Patent Document 2] 3GPP TS 23.401 V15.1.0 (2017 September)
[Non-Patent Document 3] 3GPP TS 24.008 V15.0.0 (2017-09)

SUMMARY OF INVENTION

Problem to be Solved by the Invention

In a communication system such as LTE, there is a gateway that is a boundary between a core network and an external network. For example, in Evolved Packet Core (EPC), there are S-GW and P-GW (described as S/P-GW).

At the time of the initial introduction of 5G, there is a possibility that a gateway having the 5G function and an existing gateway not having the 5G function coexist depending on the operator's deployment policy. Here, the 5G function is, for example, a high-speed data communication function.

In an environment where a gateway having a 5G function and an existing gateway having no 5G function coexist, it is desirable that a user equipment that uses a 5G function is connected to a gateway having a 5G function. However, there is no conventional technique for connecting the user equipment to an appropriate gateway depending on the capability of the 5G function in the user equipment or the like.

The present invention has been made in view of the above points, and it is an object of the present invention to provide a technique that makes it possible to cause a user equipment to connect to an appropriate gateway in a communication system including a gateway having a specific function and a gateway not having the specific function.

Means for Solving the Problem

According to a disclosed technique, there is provided a communication control apparatus including:

a control unit that determine whether to select a gateway having a specific function for a user equipment based on capability information received from the user equipment and a service availability information of the user equipment received from a subscriber information management apparatus;

a transmission unit that transmits an inquiry signal including a parameter indicating that the specific function can be used to a DNS when the control unit determines to select the gateway having the specific function for the user equipment; and a reception unit that receives a list of gateways having the specific function from the DNS.

Advantage of the Invention

According to a disclosed technique, there is provided a technique that makes it possible to cause a user equipment to connect to an appropriate gateway in a communication system including a gateway having a specific function and a gateway having no specific function.

EMBODIMENTS OF THE INVENTION

Hereinafter, an embodiment (the present embodiment) of the present invention will be described with reference to the drawings. The embodiment described below is merely an example, and embodiments to which the present invention is applied are not limited to the following embodiments.

In the embodiments described below, terms such as node names and signal names used in existing LTE and the like are used, but the same nodes, signals, etc. may be called by other names. In the following embodiments, the 5G function is cited as an example of the specific function of the GW, but the present invention is not limited to the 5G function and can be applied to any function.

System Configuration, Operation Example

Figure 1:
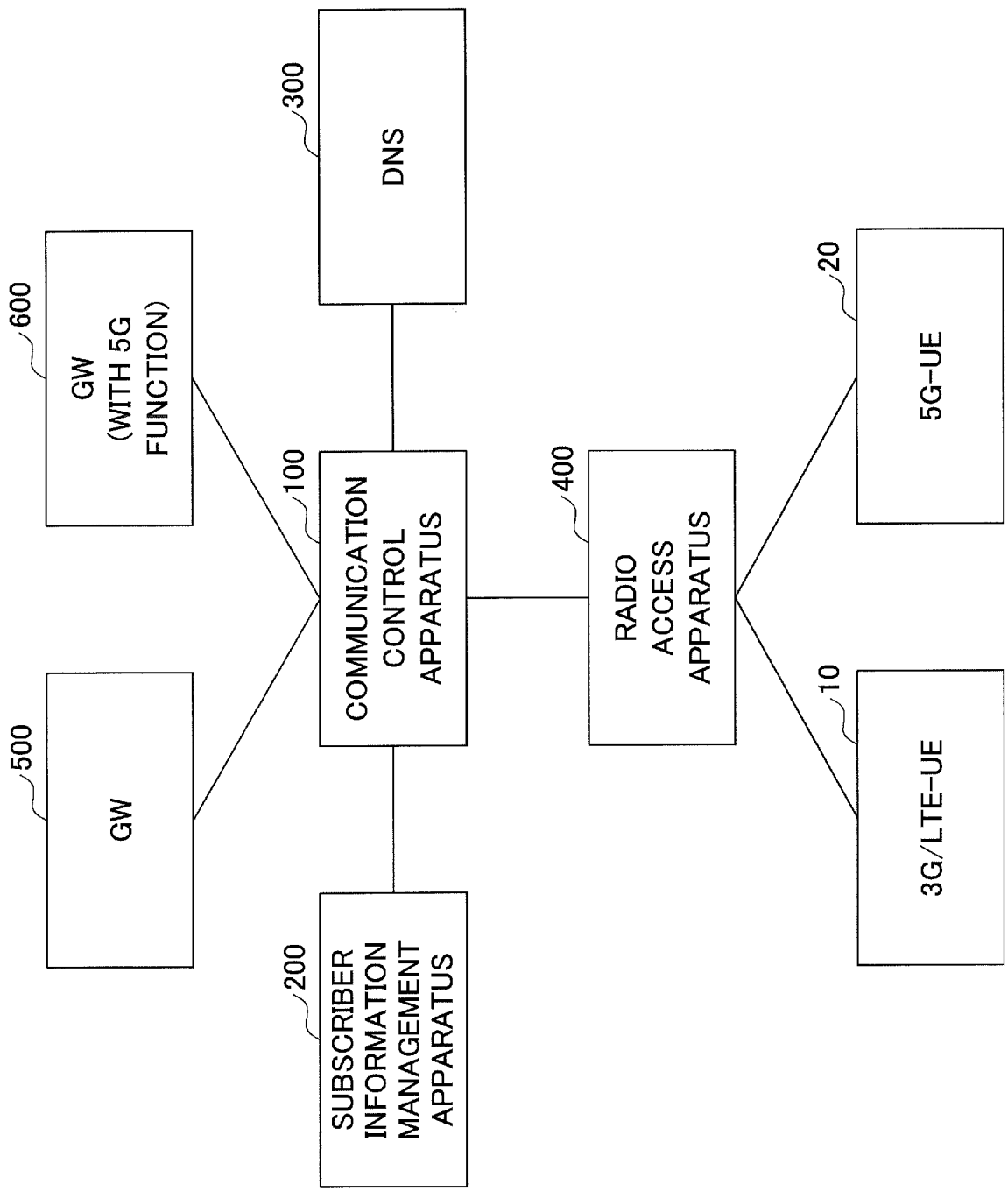
FIG. 1 is a block diagram of a communication system in an embodiment.

FIG. 1 shows a configuration example of a communication system according to an embodiment of the present invention. As shown in FIG. 1, the communication system according to the present embodiment includes a radio access apparatus 400, a communication control apparatus 100, a subscriber information management apparatus 200, a DNS 300, a GW 500, and a GW (with 5G function) 600, and has a configuration in which these are connected as shown in the figure. The radio access apparatus 400 is, for example, a base station, and performs radio communication with a 3G/LTE-UE 10, a 5G-UE 20, and the like under the base station.

The UE is a user equipment such as a mobile phone, and it is assumed that 3G/LTE-UE 10 having the conventional functions of 3G and LTE in the related art, or 5G-UE 20 having the function of 5G connects to the radio access apparatus 400.

The communication control apparatus 100 is, for example, a node that performs mobility control such as location registration. The DNS 300 is an apparatus including a function of returning an IP address in response to a query by a name (eg, FQDN). The subscriber information management apparatus 200 manages various subscriber information such as position information and contract information, and in the present embodiment, stores information indicating use availability of the 5G function by the UE in association with the identification information of the UE.

The GW is a gateway that connects to an external network and the like, and it is assumed that it is an apparatus (system) including an S-GW and a P-GW which will be described later, but it is not limited thereto. Further, in the present embodiment, the GW 500 is provided as a GW without a 5G function, and the GW (with a 5G function) 600 is provided as a GW with a 5G function. In general, a plurality of GWs and a plurality of GWs (with 5G function) are provided.

Figure 2:
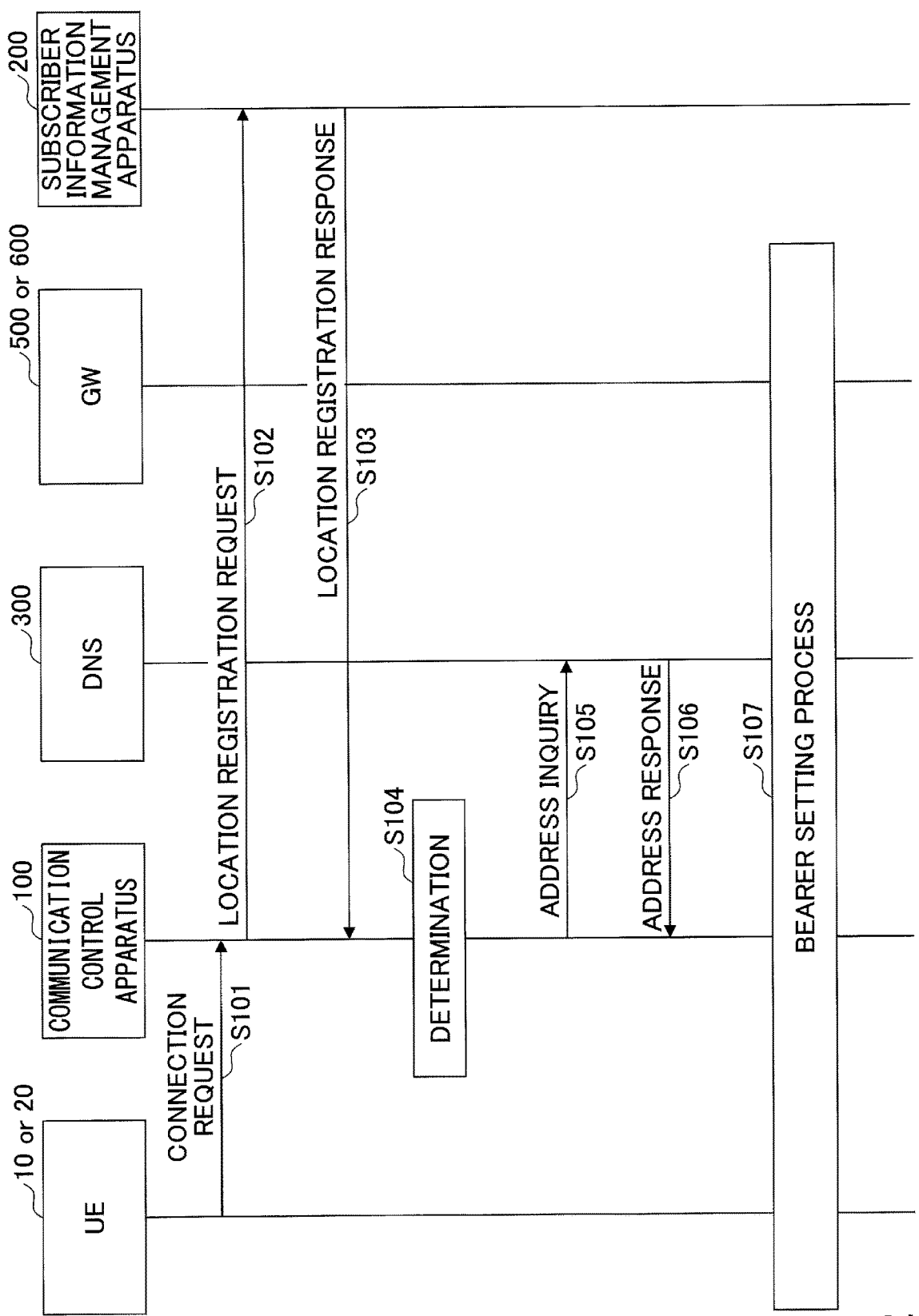
FIG. 2 is a diagram for explaining an operation of a communication system.

Next, an operation example of the communication system shown in FIG. 1 will be described with reference to FIG. 2. In the following description, the UE (3G/LTE-UE 10 or 5G-UE 20 having the function of 5G) that transmits a connection request is described as a user equipment UE. FIG. 2 shows an operation example in the case where the user equipment UE makes a connection to the network, for example, at the time of attach. Also, when referring to a general user equipment, it is described as a user equipment.

First, the user equipment UE transmits a connection request signal to the communication control apparatus 100 (S101). Capability information indicating the presence or absence of the capability of the 5G function in the user equipment UE is included in the connection request signal.

Next, the communication control apparatus 100 transmits a location registration request signal to the subscriber information management apparatus 200 (S102). The location registration request signal includes identification information of the user equipment UE that transmitted the connection request signal. In addition, the subscriber information management apparatus 200 holds information indicating whether or not the user apparatus can use the 5G function in association with the identification information of each user equipment. This information is, for example, subscriber information indicating presence or absence of 5G contract as contract information of a subscriber of the user equipment.

The subscriber information management apparatus 200 returns a location registration response signal to the communication control apparatus 100 (S103). The location registration response signal includes information indicating whether the user equipment UE that transmitted the connection request signal is allowed to use the 5G function. This information may be referred to as 5G availability information or service availability information.

Subsequently, based on the capability information (presence/absence of 5G capability) of the user equipment UE received in S101 and the 5G availability information of the user equipment UE received in S103, the communication control apparatus 100 determines which of the GW 500 and GW (with 5G function) 600 is to be connected to the user equipment UE (S104).

More specifically, when it is determined that the user equipment UE has 5G capability and that use of 5G by the user equipment UE is allowed, the communication control apparatus 100 determines to cause the user equipment UE to connect to the GW (with 5G function) 600. That is, the communication control apparatus 100 selects a GW (with 5G function) 600 having a 5G function which is a specific function for the user equipment UE.

When the user equipment UE does not have 5G capability or the user equipment UE is not allowed to use 5G, the communication control apparatus 100 determines to cause the user equipment UE to connect to the GW 500.

Further, the communication control apparatus 100 may store an operator policy in advance, and may determine to cause the user equipment UE to connect to which of the GW 500 and the GW (with 5G function) 600.

Here, for example, it is assumed that the communication control apparatus 100 can grasp the position of the user equipment UE based on position information received from the user equipment UE having a position information acquiring function. It is also assumed that the communication control apparatus 100 holds information indicating that a 5G function (high-speed data communication, etc.) is to be provided to a user equipment existing in a specific area as an operator policy. In this case, the communication control apparatus 100 causes the user equipment UE to connect to the GW (with 5G function) 600 when, for example, the communication control apparatus 100 determines that "the user equipment UE has the 5G capability and use of 5G by the user equipment UE is allowed", and furthermore, based on the location information of the user equipment UE, detects that the user equipment UE exists in the specific area.

Also, for example, when 5G function providing availability is defined for each identification information of user equipment as an operator policy, if it is defined that 5G function can be provided to the user equipment UE in the operator policy, the communication control apparatus 100 may cause the user equipment UE to connect to the GW (with 5G function) 600 without using capability information received from the user equipment UE or information received from the subscriber information management apparatus 200.

Subsequently, the communication control apparatus 100 transmits an address inquiry signal to the DNS 300 in order to acquire an IP address of the GW to which the user equipment UE is caused to connected (S105). The address inquiry signal includes a name (eg, FQDN) of the connection destination and a parameter indicating presence or absence of a 5G function. Here, as an example, the connection destination (connection destination name+parameter) having the 5G function is denoted as "connection destination name (5G)", and the connection destination not having the 5G function is denoted as "connection destination name". NR may be included instead of 5G as a parameter in the inquiry signal of the GW candidate having the 5G function or the inquiry signal of the IP address of the GW having the 5G function.

When the communication control apparatus 100 determines to cause the user equipment UE to connect to the GW (5G function presence) 600 in the determination of S104, the communication control apparatus 100 transmits a signal including "connection destination name (5G)" as an address inquiry signal to the DNS 300 (S105). Further, when the communication control apparatus 100 determines to cause the user equipment UE to connect to the GW 500 in the determination of S104, the communication control apparatus

100 transmits a signal including "connection destination name" as an address inquiry signal to the DNS 300 (S105).

When receiving a signal including "connection destination name (5G)" as the address inquiry signal, the DNS 300 returns an IP address of the GW (with 5G function) 600 to the communication control apparatus 100 (S106). When receiving a signal including "connection destination name" as the address inquiry signal, the DNS 300 returns an IP address of the GW 500 to the communication control apparatus 100 (S106). The communication control apparatus 100 may send an inquiry signal for inquiring the GW candidate to the DNS 300 and the DNS 300 may output a list of GW candidates as a response to the inquiry signal.

Thereafter, a bearer setting process for connecting the GW selected as the connection destination and the user equipment UE is executed (S107), and the user equipment UE performs data communication with the external network via the GW of the connection destination.

DETAILED EXAMPLE

System Configuration

Figure 3:
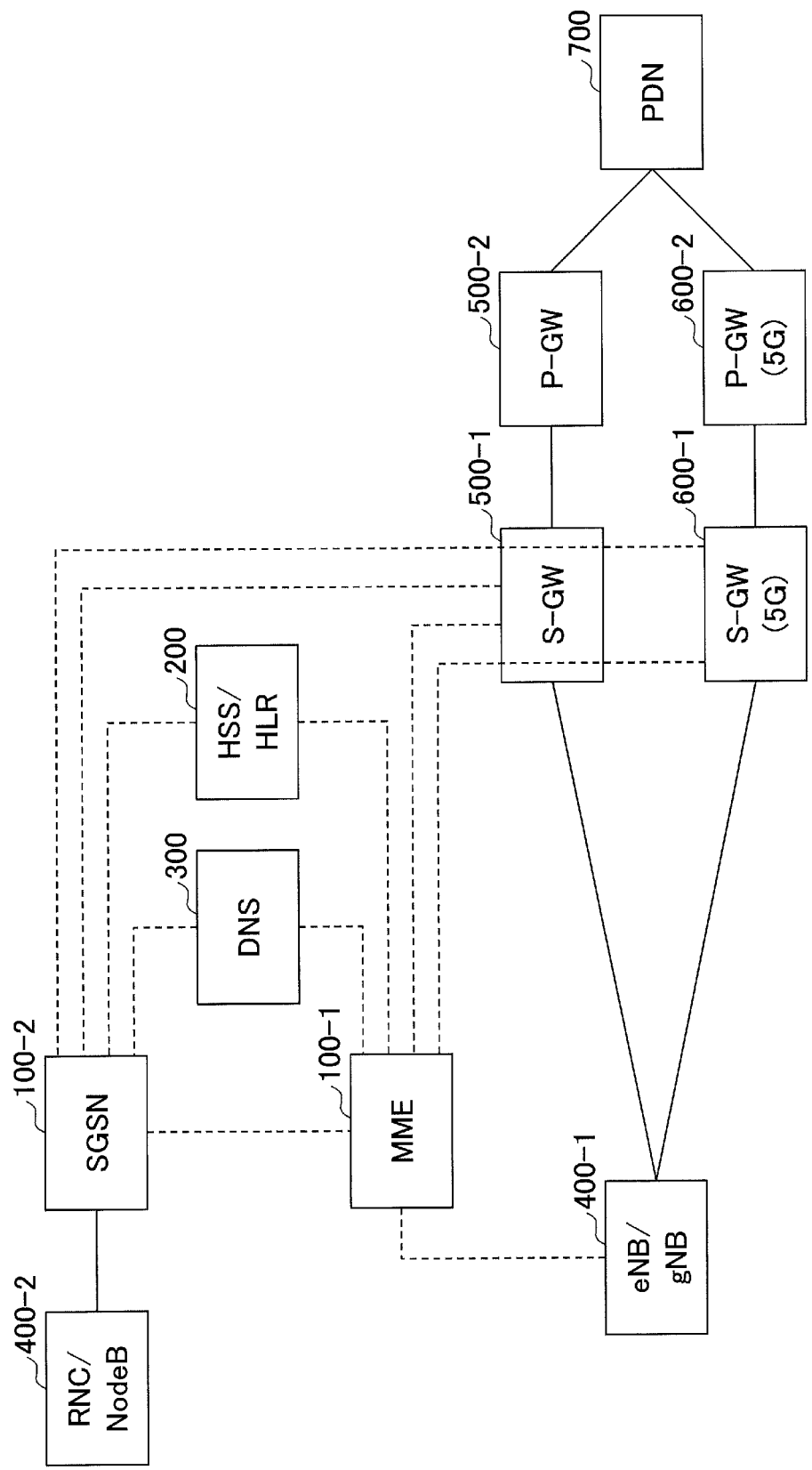
FIG. 3 is a diagram showing a detailed example of a communication system.

Next, a detailed example of the communication system according to the present embodiment will be described. FIG. 3 is a diagram showing a configuration according to a detailed example of a communication system, and the example shown in FIG. 3 is an example based on an Evolved Packet Core (EPC) network architecture.

As shown in FIG. 3, the communication system includes an eNB/gNB 400-1, an MME (Mobile Management Entity) 100-1, an S-GW (Serving Gateway) 500-1, a P-GW (Packet Data Network Gateway) 500-2, S-GW (5G) 600-1, P-GW (5G) 600-2, Serving GPRS Support Node (SGSN) 100-2, RNC/NodeB 400-2, DNS 300 and HSS/HLR 200. Note that the PDN (Packet Data Network) 700 connected to the P-GW 500-2 and the P-GW (5G) 600-2 is an external network to which the EPC is connected. In FIG. 3, a dotted line indicates a control signal interface, and a solid line indicates a user data interface. However, FIG. 3 shows an outline, and there are also a control signal interface and a user data interface not shown in the figure.

The eNB/gNB 400-1 and the RNC/NodeB 400-2 shown in FIG. 3 are examples of the radio access apparatus 400 shown in FIG. 1, respectively. The MME 100-1 and the SGSN 100-2 shown in FIG. 3 are examples of the communication control apparatus 100 shown in FIG. 1. The S-GW 500-1 and the P-GW 500-2 shown in FIG. 3 are examples of the GW 500 shown in FIG. 1, and the S-GW (5G) 600-1 and the P-GW (5G) 600-2 is an example of the GW (with 5G function) 600 shown in FIG. 1. In addition, the HSS (Home Subscriber Server)/HLR (Home Location Register) 200 shown in FIG. 3 is an example of the subscriber information management apparatus 200 shown in FIG. 1.

The eNB/gNB 400-1 shown in FIG. 3 is an LTE-supporting base station (eNB) or a 5G-supporting base station (gNB). The eNB/gNB 400-1 may have a configuration in which the eNB and gNB are connected by dual connectivity.

The RNC/NodeB 400-2 has a configuration including a 3G-supporting radio network controller and a base station.

The MME 100-1 is a node accommodating the base stations and performing mobility control and the like. The SGSN 100-2 is a node having a packet communication function. Each of the S-GW 500-1 and the S-GW (5G) 600-1 is a residing packet gateway accommodating 3GPP access systems. However, the S-GW (5G) 600-1 has a 5G function (eg, a high-speed data transfer function).

Each of the P-GW 500-2 and the P-GW (5G) 600-2 is a connection point with the PDN 700, and is a gateway that performs IP address allocation and packet transfer to the S-GW 500-1/S-GW (5G) 600-1 and the like. However, the P-GW (5G) 600-2 has a 5G function (eg, high-speed data transfer function).

Note that the S-GW 500-1 and P-GW 500-2 may be described as S/P-GW 500 and the S-GW (5G) 600-1 and P-GW (5G) 600-2 may be described as S/P-GW 600.

The DNS 300 is an apparatus that returns an IP address etc. in response to a query by a name. The HSS/HLR 200 is an HSS or an HLR, or HSS and HLR. Each of the HSS and the HLR is an apparatus that manages subscriber information (contract information, position information, etc.).

Operation Example

Figure 4:
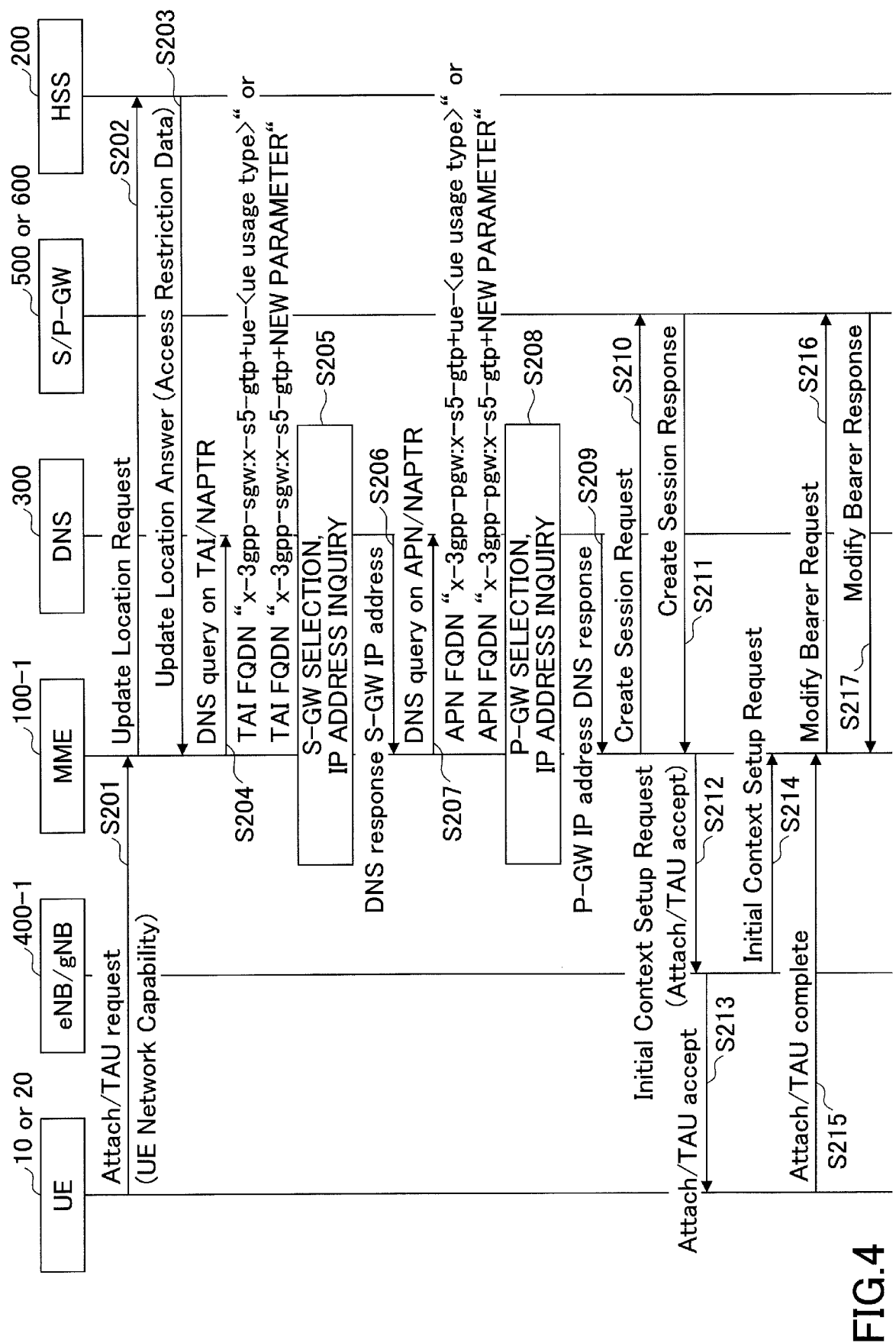
FIG. 4 is a sequence diagram in the case where selection of S/P-GW is performed in the MME.
Figure 5:
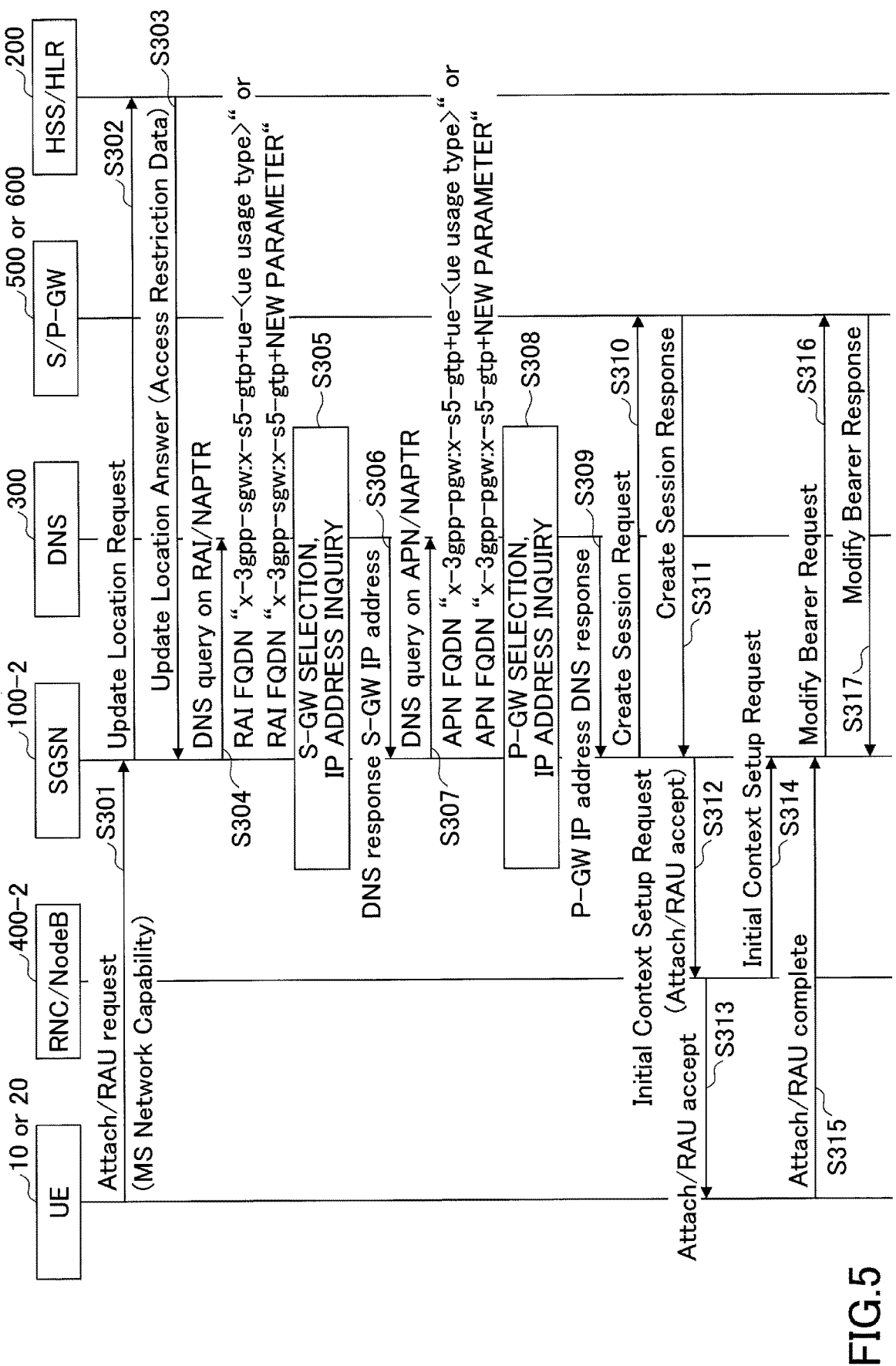
FIG. 5 is a sequence diagram in the case of selecting S/P-GW in SGSN.

Next, an operation example in the communication system shown in FIG. 3 will be described with reference to FIG. 4 and FIG. 5. First, with reference to FIG. 4, an operation example in the case of selecting the S/P-GW in the MME 100-1 will be described.

First, the user equipment UE transmits an Attach/TAU request (Attach request or TAU request) equivalent to a connection request to the MME 100-1 via the eNB/gNB 400-1 (S201). The Attach/TAU request includes, for example, UE Network Capability which is capability information indicating presence/absence of the 5G capability of the user equipment UE (Non-Patent Document 1).

Next, the MME 100-1 transmits an Update Location Request to the HSS 200 (S202). The Update Location Request contains identification information of the user equipment UE that transmitted the Attach/TAU request. In addition, the HSS 200 holds subscriber information indicating whether or not the user equipment can use the 5G function in association with the identification information of each user equipment. This information is held, for example, as data of Access Restriction (Non-Patent Document 2).

The HSS 200 returns an Update Location Answer to the MME 100-1 (S203). The Update Location Answer includes a parameter indicating whether or not the user equipment UE that transmitted the connection request can use the 5G function.

Subsequently, based on the capability information (presence/absence of 5G capability) of the user equipment UE received in S201 and the 5G availability information of the user equipment UE received in S203, the MME 100-1 determines which of the S/P-GW 500 and the S/P-GW (5G) 600 to cause the user equipment UE to connect to.

More specifically, similarly to the determination method described with reference to FIG. 2, when the MME 100-1 determines that the user equipment UE has the 5G capability and that use of the 5G by the user equipment UE is allowed, the MME 100-1 determines to cause the user equipment UE to connect to the S/P-GW (5G) 600.

If the user equipment UE does not have the 5G capability or if use of the 5G by the user equipment UE is not allowed, the MME 100-1 decides to cause the user equipment UE to connect to the S/P-GW 500.

Further, the MME 100-1 may store an operator policy in advance and determine to cause the user equipment UE to connect to which of the S/P-GW 500 and the S/P-GW (5G) 600 based on an operator policy stored in advance. For example, it is assumed that the MME 100-1 holds information indicating that a 5G function (high-speed communication, etc.) is to be provided to user equipments existing in a specific area as an operator policy. In this case, for example, if the MME 100-1 determines that "the user equipment UE has 5G capability and the user equipment UE is permitted to use 5G", and furthermore, if the MME 100-1 detects that the user equipment UE exists in a specific area based on the location information of the user equipment UE, the MME 100-1 causes the user equipment UE to connect to the S/P-GW (5G) 600.

Also, when 5G function providing availability is defined for each identification information of user equipment as an operator policy, if it is defined that the 5G function can be provided to the user equipment UE in the operator policy, the MME 100-1 may cause the user equipment UE to connect to the S/P-GW (5G) 600 without using capability information received from the user equipment UE or information received from the HSS 200.

Subsequently, the MME 100-1 transmits DNS query on TAI/NAPTR as an inquiry of S-GW candidate to the DNS 300 (S204). The DNS query on TAI/NAPTR includes TAI FQDN and service parameters.

The service parameter is, for example, "x-3gpp-sgw:x-s5-gtp+ue-<ue usage type>". The service parameter may be ue usage type. When the MME 100-1 decides to cause the user equipment UE to connect to the S/P-GW (5G) 600, the MME 100-1 sets information of a terminal type indicating that the user equipment UE can use the 5G function, such as "5G UE", as the ue usage type. In this case, the service parameter is "x-3gpp-sgw:x-s5-gtp+ue-<5G UE>" or 5G UE. The information on the terminal type may be received from the HSS 200 by the MME 100-1 in S203 or may be information managed by the MME 100-1 itself. Also, the MME 100-1 may receive the information on the terminal type from the HSS 200 at a timing other than S203.

The service parameter may be, for example, "x-3gpp-sgw:x-s5-gtp+new parameter". The service parameter may be a "new parameter". This new parameter is, for example, "5G" indicating that the user equipment UE uses the 5G function. That is, in this case, the service parameter is "x-3gpp-sgw:x-s5-gtp+5g" or 5g.

When the MME 100-1 decides to cause the user equipment UE to connect to the S/P-GW 500, for example, the MME 100-1 sets an existing value other than "5G UE" to ue usage type in "x-3gpp-sgw:x-s5-gtp+ue-<ue usage type>".

Following S204, the MME 100-1 receives an answer of the S-GW group (list of S-GW candidates) from the DNS 300, selects a S-GW, and transmits an address query of the selected S-GW to the DNS 300 (S205). Here, in S204, when the MME 100-1 transmits a DNS query including "x-3gpp-sgw:x-s5-gtp+ue-<5G UE>" or "x-3gpp-sgw:x-s5-gtp+5g" as the service parameter, the MME 100-1 receives, from the DNS 300, a response of a S-GW group (list of S-GW candidates) having the 5G function and selects, for example, the S-GW (5G) 600-1 from among them.

In S206, the MME 100-1 receives an IP address of the selected S-GW (5G) 600-1.

Subsequently, the MME 100-1 transmits DNS query on APN/NAPTR as an inquiry of P-GW candidates to the DNS 300 (S207). DNS query on APN/APTR includes APN FQDN and a service parameter.

The service parameter is, for example, "x-3gpp-pgw:x-s5-gtp+ue-<ue usage type>". The service parameter may be ue usage type. When the MME 100-1 decides to cause the user equipment UE to connect to the S/P-GW (5G) 600, the MME 100-1 sets, to the ue usage type, information of the above-mentioned terminal type such as "5G UE", for example. In this case, the service parameter is "x-3gpp-pgw:x-s5-gtp+ue-<5G UE>" or 5G UE.

Further, the service parameter may be "x-3gpp-pgw:x-s5-gtp+new parameter", for example. The service parameter may be "new parameter". This new parameter is, for example, "5G" indicating that the user equipment UE uses the 5G function. That is, in this case, the service parameter is "x-3gpp-pgw:x-s5-gtp+5g" or 5g.

When the MME 100-1 decides to cause the user equipment UE to connect to the S/P-GW 500, the MME 100-1 sets an existing value other than "5G UE" as the ue usage type in "x-3gpp-pgw:x-s5-gtp+ue-<ue usage type>", for example.

Following S207, the MME 100-1 receives a reply of a P-GW group (list of P-GW candidates) from the DNS 300, selects a P-GW, and transmits an address inquiry of the selected P-GW to the DNS 300 (S208). Here, in S207, when the MME 100-1 transmits the DNS query having "x-3gpp-pgw:x-s5-gtp+ue-<5G UE>" or "x-3gpp-pgw:x-s5-gtp+5g" as a service parameter, the MME 100-1 receives, from the DNS 300, a response of a P-GW group (list of P-GW candidates) having the 5G function and, selects, for example, the P-GW (5G) 600-2 from among them. In S209, the MME 100-1 receives an IP address of the selected S-GW (5G) 600-2.

Since the subsequent processing of S210 to S217 is an existing processing for bearer setting, it will briefly be explained. The MME 100-1 transmits a Create Session Request to the selected S/P-GW using the IP address (S210), and receives a Create Session Response from the S/P-GW (S211). The MME 100-1 transmits an Initial Context Setup Request (Attach/TAU accept) to the eNB/gNB 400-1 (S212), and the eNB/gNB 400-1 transmits Attach/TAU accept to the user equipment UE (S213). The eNB/gNB 400-1 transmits an Initial Context Setup Request to the MME 100-1 (S214), and the user equipment UE transmits an Attach/TAU complete to the MME 100-1. Then, the MME 100-1 transmits a Modify Bearer Request to the S/P-GW (S216), and the S/P-GW transmits a Modify Bearer Response to the MME 100-1 (S217).

Next, with reference to FIG. 5, an operation example in the case of selecting a S/P-GW in the SGSN 100-2 will be described.

First, the user equipment UE transmits an Attach/RAU request (Attach request or RAU request) equivalent to a connection request to the SGSN 100-2 via the RNC/NodeB 400-1 (S301). The Attach/RAU request includes, for example, MS Network Capability which is capability information indicating the presence/absence of the 5G capability of the user equipment UE (Non-Patent Document 3).

Next, the SGSN 100-2 transmits an Update Location Request to the HSS/HLR 200 (S302). The Update Location Request contains identification information of the user equipment UE that transmitted the Attach/RAU request. In addition, the HSS/HLR 200 holds subscriber information indicating whether or not the user equipment is allowed to use the 5G function in association with the identification information of each user equipment. This information is held, for example, as data of Access Restriction.

The HSS/HLR 200 returns an Update Location Answer to the SGSN 100-2 (S303). The Update Location Answer includes a parameter indicating whether or not the user equipment UE that transmitted the connection request is allowed to use the 5G function.

Subsequently, based on the capability information (presence/absence of 5G capability) of the user equipment UE received in S301 and the 5G availability information of the user equipment UE received in S303, the SGSN 100-2 determines which of the S/P-GW 500 and the S/P-GW (5G) 600 to cause the user equipment UE to connect to.

More specifically, similarly to the determination method described with reference to FIG. 2, when the SGSN 100-2 determines that the user equipment UE has the 5G capability and that use of the 5G by the user equipment UE is possible, the SGSN 100-2 determines to cause the user equipment UE to connect to the S/P-GW (5G) 600.

If the user equipment UE does not have the 5G capability or if use of the 5G utilization by the user equipment UE is not possible, the SGSN 100-2 decides to cause the user equipment UE to connect to the S/P-GW 500.

Further, the SGSN 100-2 may stores an operator policy in advance and determine to cause the user equipment UE to connect to which of the S/P-GW 500 and the S/P-GW (5G) 600 based on an operator policy stored in advance. For example, it is assumed that the SGSN 100-2 holds information indicating that a 5G function (high-speed communication, etc.) is to be provided to user equipments existing in a specific area as an operator policy. In this case, for example, if the SGSN 100-2 determines that "the user equipment UE has 5G capability and the user equipment UE can use 5G", and furthermore, if the SGSN 100-2 detects that the user equipment UE exists in the specific area based on the location information of the user equipment UE, the SGSN 100-2 causes the user equipment UE to connect to the S/P-GW (5G) 600.

Also, for example, when 5G function providing availability is defined for each identification information of user equipment as an operator policy, if it is defined that 5G function can be provided to the user equipment UE in the operator policy, the SGSN 100-2 may cause the user equipment UE to connect to the S/P-GW (5G) 600 without using capability information received from the user equipment UE or information received from the HSS/HLR 200.

Subsequently, the SGSN 100-2 transmits a DNS query on RAI/NAPTR as an inquiry of S-GW candidates to the DNS 300 (S304). The DNS query on RAI/NAPTR includes RAI FQDN and service parameters.

The service parameter is, for example, "x-3gpp-sgw:x-s5-gtp+ue-<ue usage type>". The service parameter may be ue usage type. When the SGSN 100-2 decides to cause the user equipment UE to connect to the S/P-GW (5G) 600, the SGSN 100-2 sets information of the terminal type indicating that the user equipment UE can use the 5G function, such as "5G UE", as the ue usage type. In this case, the service parameter is "x-3gpp-sgw:x-s5-gtp+ue-<5G UE>" or 5G UE. The information on the terminal type may be received from the HSS/HLR 200 by the SGSN 100-2 or may be information managed by the SGSN 100-2 itself in S303. Also, the SGSN 100-2 may receive the information on the terminal type from the HSS/HLR 200 at a timing other than S303.

The service parameter may be, for example, "x-3gpp-sgw:x-s5-gtp+new parameter". The service parameter may be a "new parameter." This new parameter is, for example, "5G" indicating that the user equipment UE uses the 5G function. That is, in this case, the service parameter is "x-3gpp-sgw:x-s5-gtp+5g" or 5g.

When the SGSN 100-2 decides to cause the user equipment UE to connect to the S/P-GW 500, for example, the SGSN 100-2 sets an existing value other than "5G UE" to ue usage type in "x-3gpp-sgw:x-s5-gtp+ue-<ue usage type>".

Following S304, the SGSN 100-2 receives the answer of a S-GW group (list of S-GW candidates) from the DNS 300, selects a S-GW, and transmits an address query of the selected S-GW to the DNS 300 (S305). Here, in S304, when the SGSN 100-2 transmits a DNS query including "x-3gpp-sgw:x-s5-gtp+ue-<5G UE>" or "x-3gpp-sgw:x-s5-gtp+5g" as the service parameter, the SGSN 100-2 receives, from the DNS 300, a response of a S-GW group (list of S-GW candidates) having the 5G function and selects, for example, the S-GW (5G) 600-1 from among them.

In S306, the SGSN 100-2 receives an IP address of the selected S-GW (5G) 600-1.

Subsequently, the SGSN 100-2 transmits a DNS query on APN/NAPTR as an inquiry of P-GW candidates to the DNS 300 (S307). The DNS query on APN/NAPTR includes APN FQDN and a service parameter.

The service parameter is, for example, "x-3gpp-pgw:x-s5-gtp+ue-<ue usage type>". The service parameter may be ue usage type. When the SGSN 100-2 decides to cause the user equipment UE to connect to the S/P-GW (5G) 600, the SGSN 100-2 sets, to the ue usage type, information of the above-mentioned terminal type such as "5G UE", for example. In this case, the service parameter is "x-3gpp-pgw:x-s5-gtp+ue-<5G UE>" or 5G UE.

Further, the service parameter may be "x-3gpp-pgw:x-s5-gtp+new parameter", for example.

The service parameter may be "new parameter". This new parameter is, for example, "5G" indicating that the user equipment UE uses the 5G function. That is, in this case, the service parameter is "x-3gpp-pgw:x-s5-gtp+5g" or 5g.

When the SGSN 100-2 decides to cause the user equipment UE to connect to the S/P-GW 500, the SGSN 100-2 sets an existing value other than "5G UE" as the ue usage type in "x-3gpp-pgw:x-s5-gtp+ue-<ue usage type>", for example.

Following S307, the SGSN 100-2 receives a reply of the P-GW group (list of P-GW candidates) from the DNS 300, selects the P-GW, and transmits an address inquiry of the selected P-GW to the DNS 300 (S308). Here, in S307, when the SGSN 100-2 transmits the DNS query having "x-3gpp-pgw:x-s5-gtp+ue-<5G UE>" or "x-3gpp-pgw:x-s5-gtp+5g" as a service parameter, the SGSN 100-2 receives, from the DNS 300, a response of a P-GW group (list of P-GW candidates) having the 5G function and, selects, for example, the P-GW (5G) 600-2 from among them. In S309, the SGSN 100-2 receives an IP address of the selected S-GW (5G) 600-2.

Since the subsequent processing of S310 to S317 is an existing processing for bearer setting, it will briefly be explained. The SGSN 100-2 transmits a Create Session Request to the selected S/P-GW using the IP address received from the DNS 300 (S310), and receives a Create Session Response from the S/P-GW (S311). The SGSN 100-2 transmits an Initial Context Setup Request (Attach/RAU accept) to the RNC/NodeB400-2 (S312), and the RNC/NodeB400-2 transmits Attach/RAU accept to the user equipment UE (S313). The RNC/NodeB400-2 transmits an Initial Context Setup Request to the SGSN 100-2 (S314), and the user equipment UE transmits an Attach/RAU complete to the SGSN 100-2. Then, the SGSN 100-2 transmits a Modify Bearer Request to the S/P-GW (S316), and the S/P-GW transmits a Modify Bearer Response to the SGSN 100-2 (S317).

According to the processing of the present embodiment, for example, it is possible to cause a user equipment having 5G capability to connect to a S/P GW having a 5G function (example: setting a bearer), so that the user equipment having 5G capability can receive a service using the 5G function.

Apparatus Configuration

Next, an example of the functional configuration of the communication control apparatus 100 (MME 100-1 or SGSN 100-2) that executes the processing operations described above will be described.

Figure 6:
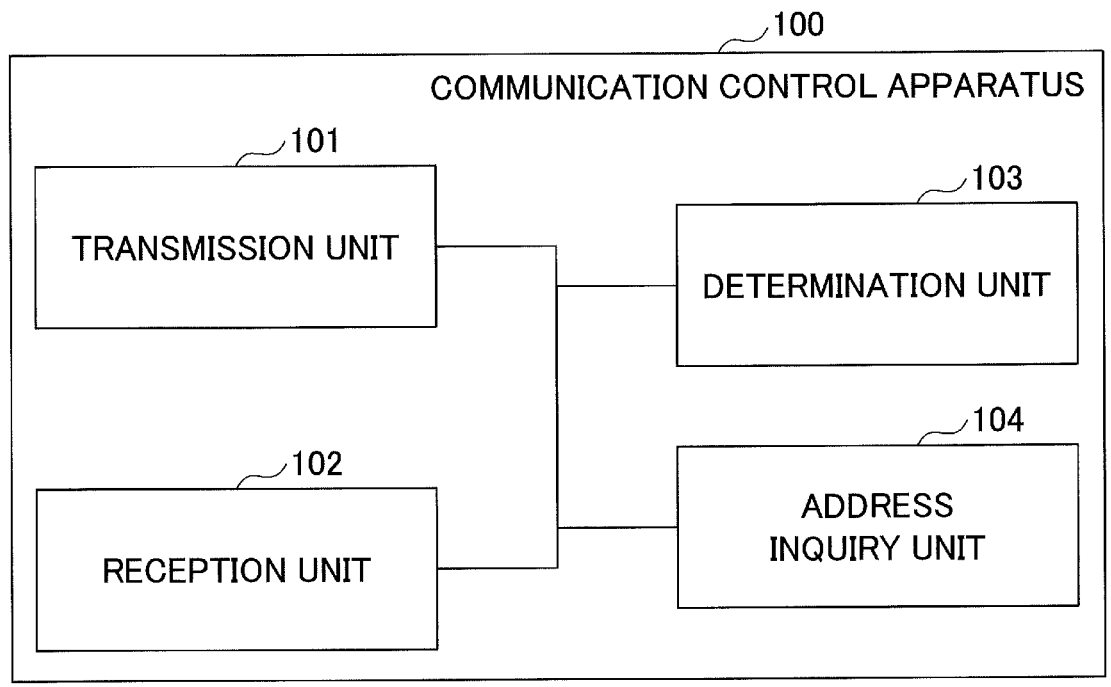
FIG. 6 is a diagram illustrating an example of a functional configuration of a communication control apparatus (MME/SGSN) according to an embodiment.

FIG. 6 is a diagram showing an example of a functional configuration of the communication control apparatus 100. As shown in FIG. 6, the communication control apparatus 100 includes a transmission unit 101, a reception unit 102, a determination unit 103, and an address inquiry unit 104. The functional configuration shown in FIG. 6 is just an example. As long as the operation according to the present embodiment can be executed, the function division and the name of the functional unit may be anything. It should be noted that the transmitting unit 101 may be referred to as a transmitter and the receiving unit 102 may be referred to as a receiver. Further, the determination unit 103 may be referred to as a control unit. Further, a function related to transmission in the address inquiry unit 104 may be included in the transmission unit 101, and a function related to reception in the address inquiry unit 104 may be included in the reception unit 102.

The transmission unit 101 includes a function of generating a transmission signal and transmitting the transmission signal. The signals to be transmitted are, for example, signals transmitted by the MME/SGSN in FIGS. 4 and 5. The reception unit 102 includes a function of receiving various signals. The signal to receive is, for example, a signal received by the MME/SGSN in FIGS. 4 and 5.

For example, as described with reference to FIG. 2, FIG. 4, and FIG. 5, the determination unit 103 determines, as a connection destination, a GW having a 5G function or an existing GW without the 5G function. The address inquiry unit 104 executes inquiry transmission to the DNS 300 and answer reception from the DNS 300 via the transmission unit 101/reception unit 102.

For example, the communication control apparatus 100 is a communication control apparatus in a communication system including a first gateway not having a specific function, a second gateway having the specific function, a subscriber information management apparatus, a DNS, and the communication control apparatus. The determination unit 103 is configured to determine whether to cause a user equipment to connect to the second gateway based on capability information received from the user equipment and a service availability information of the user equipment received from the subscriber information management apparatus. The address inquiry unit 104 is configured, when the determination unit determines to cause the user equipment to connect to the second gateway, to transmit an address inquiry signal having a parameter indicating that the specific function is usable to the DNS, and receive an address of the second gateway from the DNS.

Also, for example, the communication control apparatus may be configured to include: a control unit (corresponding to the determination unit 103) that determines whether to select a gateway having a specific function for a user equipment based on capability information received from the user equipment and a service availability information of the user equipment received from a subscriber information management apparatus; a transmission unit that transmits an inquiry signal including a parameter indicating that the specific function can be used to a DNS when the control unit determines to select the gateway having the specific function for the user equipment; and a reception unit 102 that receives a list of gateways having the specific function from the DNS.

The determination unit 103 or the control unit may determine whether to select the gateway having the specific function for the user equipment based on a predetermined policy.

The determination unit 103 or the control unit determines to select the gateway having the specific function for the user equipment, for example, when the capability information is information indicating that it is possible to use the specific function, and when the service availability information is information indicating that it is possible to use the specific function.

Hardware Configuration

The above block diagram (FIG. 6) illustrates the blocks of the functional units. The functional blocks (constituent parts) are implemented by an arbitrary combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 7:
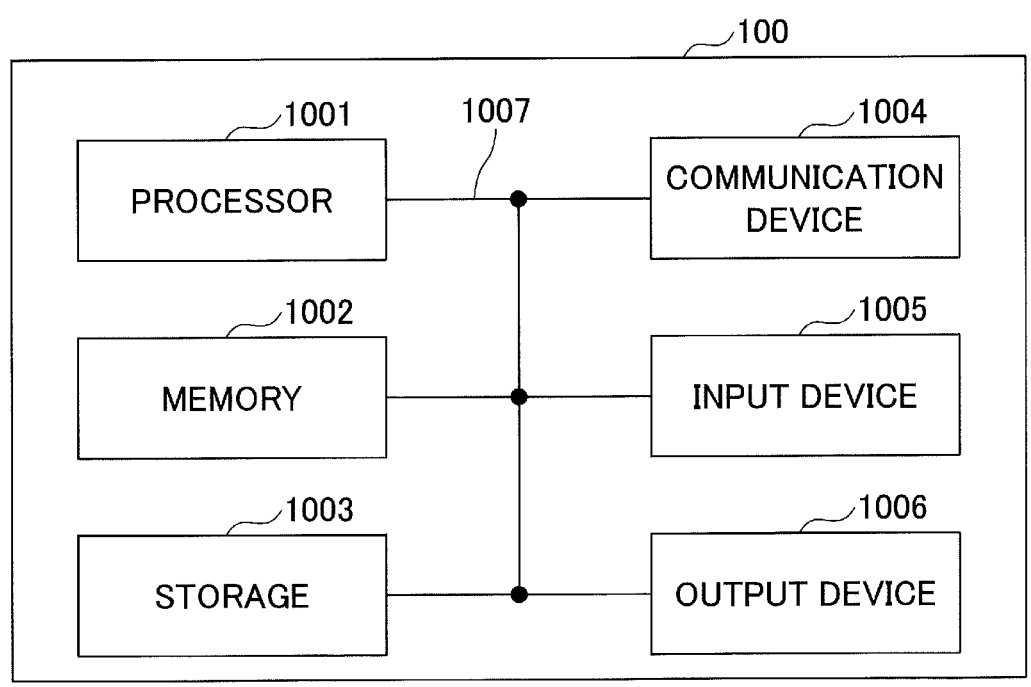
FIG. 7 is a diagram illustrating an example of a hardware configuration of a communication control apparatus according to an embodiment.

For example, the communication control apparatus 100 (MME/SGSN) according to the embodiment of the present invention may function as a computer that performs the process according to the present embodiment. FIG. 7 is a diagram illustrating an example of a hardware configuration of the communication control apparatus 100 according to the embodiment of the present invention. As illustrated in FIG. 7, the communication control apparatus 100 may physically be configured as a computer device that includes a processor 1001, a memory 1002, a storage 1003, a communication device 1004, an input device 1005, an output device 1006, a bus 1007, and the like. Note that, the DNS 300, the subscriber information management apparatus 200, the base station (eNB, gNB, RNC, NodeB) and the UE may also have the configuration shown in FIG. 7.

In the following description, the term "device" can be replaced with a circuit, a device, a unit, or the like. The hardware configuration of the communication control apparatus 100 may be configured to include one or more devices (units) illustrated in the drawing or may be configured without including some devices.

Each function in the communication control apparatus 100 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be constituted by a central processing unit (CPU: Central Processing Unit) including an interface with a peripheral device, a control device, an operation device, a register and the like.

Further, the processor 1001 reads a program (a program code), a software module, and data from the storage 1003 and/or the communication device 1004 out to the memory 1002, and performs various kinds of processes according to them. As the program, a program causing a computer to execute at least some of the operations described in the above embodiment is used. For example, each unit of the communication control apparatus 100 may be implemented by a control program which is stored in the memory 1002 and operates on the processor 1001. Various kinds of processes have been described as being performed by one processor 1001 or may be simultaneously or sequentially performed by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, data or the like which are executable for carrying out the processes described in the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transceiving device) for performing communication with computers via a wired and/or wireless network and is also referred to as a "network device," a "network controller," a "network card," a "communication module," or the like. For example, the transmission unit 101 and the reception unit 102 of the communication control apparatus 100 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integratedly configured (for example, a touch panel).

The respective devices such as the processor 1001 and the memory 1002 are connected via the bus 1007 to communicate information with each other. The bus 1007 may be configured with a single bus or may be configured with different buses between the devices.

Further, the communication control apparatus 100 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

Summary of the Embodiment

As described above, according to the present embodiment, there is provided a communication control apparatus including: a control unit that determine whether to select a gateway having a specific function for a user equipment based on capability information received from the user equipment and a service availability information of the user equipment received from a subscriber information management apparatus; a transmission unit that transmits an inquiry signal including a parameter indicating that the specific function can be used to a DNS when the control unit determines to select the gateway having the specific function for the user equipment; and a reception unit that receives a list of gateways having the specific function from the DNS.

According to this configuration, there is provided a technique that makes it possible to cause a user equipment to connect to an appropriate gateway in a communication system including a gateway having a specific function and a gateway having no specific function.

The control unit may determine whether to select the gateway having the specific function for the user equipment based on a predetermined policy. According to this configuration, for example, intention of the operator can be reflected to connection control.

The control unit may determine to select the gateway having the specific function for the user equipment when the capability information is information indicating that it is possible to use the specific function, and when the service availability information is information indicating that it is possible to use the specific function. According to this configuration, the user equipment can connect to a gateway suitable for the capability.

The specific function is an NR function. According to this configuration, it is possible to cause a user equipment supporting NR to connect to a gateway having a 5G function.

According to the present embodiment, there is provided a communication control method executed by a communication control apparatus including: a determination step of determining whether to select a gateway having a specific function for a user equipment based on capability information received from the user equipment and a service availability information of the user equipment received from a subscriber information management apparatus; a transmission step of transmitting an inquiry signal including a parameter indicating that the specific function can be used to a DNS when it is determined to select the gateway having the specific function for the user equipment by the determination step; and a reception step of receiving a list of gateways having the specific function from the DNS.

According to this configuration, there is provided a technique that makes it possible to cause a user equipment to connect to an appropriate gateway in a communication system including a gateway having a specific function and a gateway having no specific function.

At least following items are disclosed in the specification.
(Item 1)

A communication control apparatus in a communication system including a first gateway without a specific function, a second gateway with the specific, a subscriber information management apparatus, a DNS and the communication control apparatus, including:

a determination unit configured to determine whether to cause the user equipment to connect to the second gateway based on capability information received from the user equipment and service availability information of the user equipment received from the subscriber information management apparatus; and an address inquiry unit configured, when the determination unit determines to cause the user equipment to connect to the second gateway, to transmit, to the DNS, an address inquiry including a parameter indicating that the specific function can be used, and receive an address of the second gateway from the DNS.
(Item 2)

The communication control apparatus according to item 1, wherein the determination unit determines whether to cause the user equipment to connect to the second gateway based on a predetermined policy.

(Item 3)

The communication control apparatus according to item 1 or 2, wherein the determination unit determines to select the gateway having the specific function for the user equipment when the capability information is information indicating that it is possible to use the specific function, and when the service availability information is information indicating that it is possible to use the specific function.

(Item 4)

The communication control apparatus according to any one of claims 1-3, wherein the specific function is a 5G function.

(Item 5)

A communication control method executed by a communication control apparatus in a communication system including a first gateway without a specific function, a second gateway with the specific, a subscriber information management apparatus, a DNS and the communication control apparatus, including:

a determination step of determining whether to cause the user equipment to connect to the second gateway based on capability information received from the user equipment and service availability information of the user equipment received from the subscriber information management apparatus; and an address inquiry step of, when the determination step determines to cause the user equipment to connect to the second gateway, transmitting, to the DNS, an address inquiry including a parameter indicating that the specific function can be used, and receiving an address of the second gateway from the DNS.

Supplement of Embodiments

While the embodiment of the present invention has been described, the disclosed invention is not limited to such an embodiment, and various variations, modifications, alterations, and substitutions could be conceived by those skilled in the art. While specific examples of numerical values are used in order to facilitate understanding of the invention, these numerical values are examples only and any other appropriate values may be used unless otherwise stated particularly. The classification of items in the description is not essential in the present invention, and features described in two or more items may be used in combination, and a feature described in a certain item may be applied to a feature described in another item (unless contradiction occurs). It is not always true that the boundaries of the functional units or the processing units in the functional block diagram correspond to boundaries of physical components. The operations of a plurality of functional units may be physically performed by a single component. Alternatively, the operations of the single functional unit may be physically performed by a plurality of components. The orders in the sequence and the flowchart described in the embodiment may be switched unless contradiction occurs. For convenience of explanation of processing, the communication control apparatus 100 have been explained using functional block diagrams. However, these devices may be implemented by hardware, software, or a combination thereof. The software that operates by a processor included in the communication control apparatus 100 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, and other appropriate storage media.

Transmission of the information is not limited to the aspects/embodiments described in the invention, but may be performed by other methods. For example, transmission of the information may be performed by physical layer signaling (such as downlink control information (DCI) or uplink control information (UCI)), upper layer signaling (such as radio resource control (RRC) signaling, medium access control (MAC) signaling, broadcast information (such as a master information block (MIB) or a system information block (SIB)), other signaling, or a combination thereof. The RRC message may be referred to as RRC signaling. An RRC message may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing procedures, sequences, flowcharts and the like of the aspects/embodiments described above in this specification may be changed in the order as long as they are not incompatible with each other. For example, in the methods described in this specification, various steps as elements are described in an exemplary order and the methods are not limited to the described order.

Specific operations which are performed by the base station in this specification may be performed by an upper node thereof in some cases. In a network including one or more network nodes including a base station, various operations which are performed to communicate with a user equipment UE can be apparently performed by the base station and/or network nodes (for example, an MME or an S-GW can be considered but the network nodes are not limited thereto) other than the base station. A case in which the number of network nodes other than the base station is one has been described above, but a combination of plural different network nodes (for example, an MME and an S-GW) may be used.

The aspects described in this specification may be used alone, may be used in combination, or may be switched with implementation thereof.

The user equipment UE may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

Although details of the present invention have been described, it is clear for the person skilled in the art that the invention is not limited to the above-mentioned embodiments in the description. The present invention can be implemented as modifications and changed forms without departing from the spirit and scope of the present invention as defined by the scope of the claims. Therefore, the description of the present specification is for the purpose of illustration and does not have any restrictive meaning to the present invention.

The present patent application claims priority based on Japanese patent application No. 2017-198852, filed in the JPO on Oct. 12, 2017, and the entire contents of the Japanese patent application No. 2017-198852 are incorporated herein by reference.

LIST OF REFERENCE SYMBOLS 100 communication control apparatus
101 transmission unit
102 reception unit
103 determination unit
104 address inquiry unit
200 subscriber information management apparatus, HSS/HLR
300 DNS
400 radio access apparatus
500 GW
600 GW (with 5G function)
100-1 MME
100-2 SGSN
400-1 eNB/gNB
400-2 RNC/NodeB
500-1 S-GW
500-2 P-GW
600-1 S-GW (5G)
600-2 P-GW (5G)
1001 processor
1002 memory
1003 storage
1004 communication device
1005 input device
1006 output device

The invention claimed is:

1. A communication control apparatus comprising:
a processor that determines whether to select a gateway having a specific function for a user equipment based on capability information received from the user equipment and a service availability information of the user equipment received from a subscriber information management apparatus; and
a transceiver that:
transmits an inquiry signal including a parameter indicating that the specific function can be used to a DNS when the processor determines to select the gateway having the specific function for the user equipment; and
receives a list of gateways having the specific function from the DNS,
wherein the specific function indicates a capability of the gateway that supports a new radio (NR) function.

2. The communication control apparatus as claimed in claim 1, wherein the processor determines whether to select the gateway having the specific function for the user equipment based on an operator policy.

3. The communication control apparatus as claimed in claim 2, wherein the processor determines to select the gateway having the specific function for the user equipment when the capability information is information indicating that it is possible to use the specific function, and when the service availability information is information indicating that it is possible to use the specific function.

4. The communication control apparatus as claimed in claim 1, wherein the processor determines to select the gateway having the specific function for the user equipment when the capability information is information indicating that it is possible to use the specific function, and when the service availability information is information indicating that it is possible to use the specific function.

5. A communication control method executed by a communication control apparatus comprising:
determining whether to select a gateway having a specific function for a user equipment based on capability information received from the user equipment and a service availability information of the user equipment received from a subscriber information management apparatus;
transmitting an inquiry signal including a parameter indicating that the specific function can be used to a DNS when it is determined to select the gateway having the specific function for the user equipment by the determining; and
receiving a list of gateways having the specific function from the DNS,
wherein the specific function indicates a capability of the gateway that supports a new radio (NR) function.

* * * * *